(12) United States Patent
Sakamoto

(10) Patent No.: US 8,472,071 B2
(45) Date of Patent: Jun. 25, 2013

(54) INFORMATION PROCESSING APPARATUS, INFORMATION PROCESSING METHOD, AND COMPUTER READABLE MEDIUM STORING PROGRAM FOR PROCESSING INFORMATION

(75) Inventor: Shoji Sakamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 54 days.

(21) Appl. No.: 13/229,411

(22) Filed: Sep. 9, 2011

(65) Prior Publication Data

US 2012/0243006 A1    Sep. 27, 2012

(30) Foreign Application Priority Data

Mar. 24, 2011    (JP) ................................ 2011-065724

(51) Int. Cl.
*G06F 15/00*    (2006.01)
*G06K 1/00*    (2006.01)
(52) U.S. Cl.
USPC .............. 358/1.5; 358/1.1; 358/1.2; 358/1.13
(58) Field of Classification Search
None
See application file for complete search history.

(56) References Cited

U.S. PATENT DOCUMENTS 6,446,645 B1    9/2002    Doi

FOREIGN PATENT DOCUMENTS

JP    04-302075 A    10/1992
JP    2002-143273 A    5/2002

*Primary Examiner* — Thierry Pham
(74) *Attorney, Agent, or Firm* — Sughrue Mion, PLLC

(57) ABSTRACT

An information processing apparatus includes an acquisition unit that acquires encoded information at a position specified on a medium, the medium having the encoded information and an image printed thereon, the encoded information including identification information of the medium, first coordinate information identifying in a first coordinate system a position where the encoded information is printed, and alignment determination information determining an alignment of the encoded information, and the image, printed on the medium, at a position predetermined by second coordinate information in a second coordinate system, an identifying unit that identifies the image corresponding to the encoded information by checking the first coordinate information included in the encoded information acquired by the acquisition unit against the second coordinate information of the images printed on the medium, and a determining unit that determines whether the first coordinate system matches the second coordinate system in alignment.

7 Claims, 9 Drawing Sheets

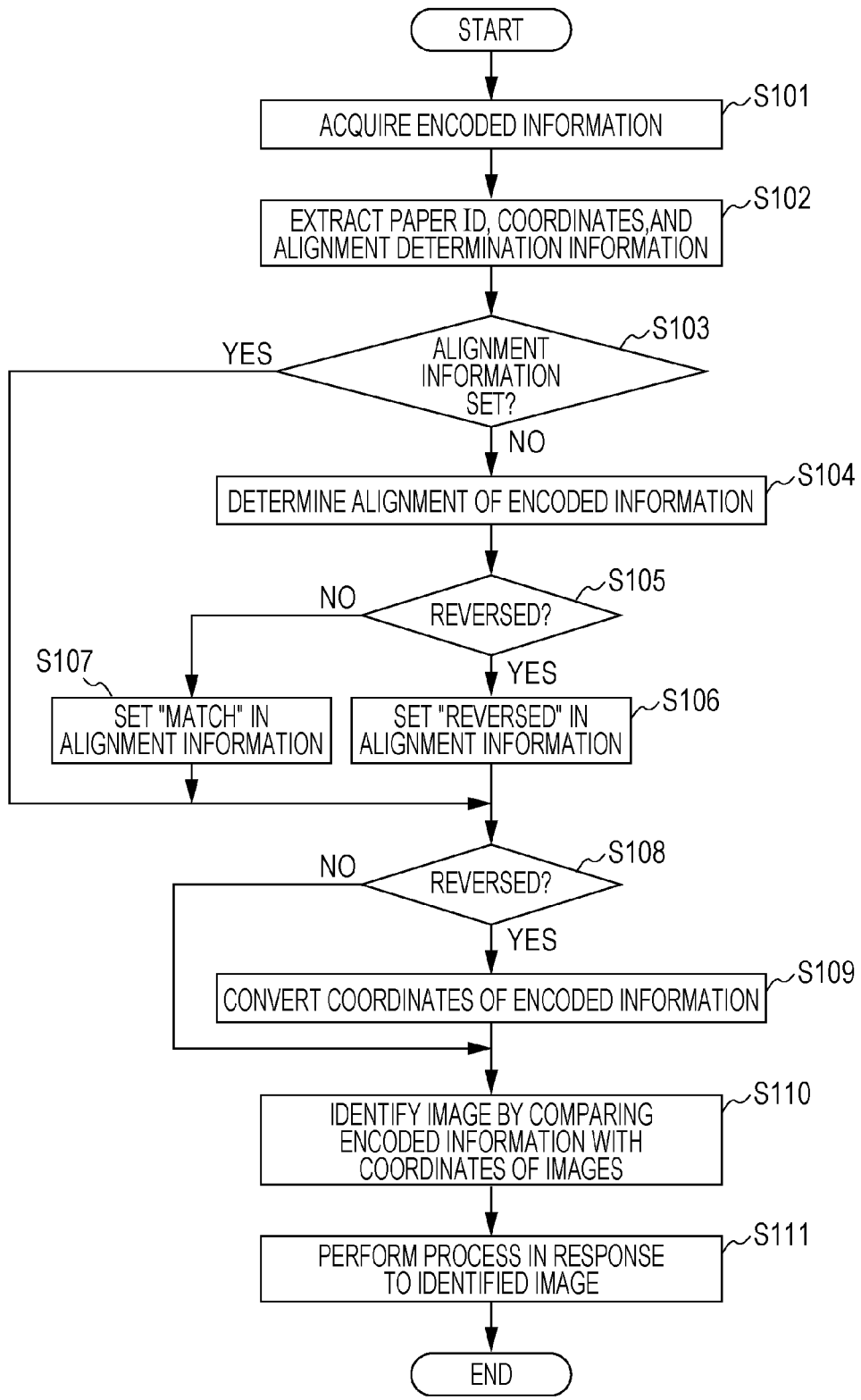

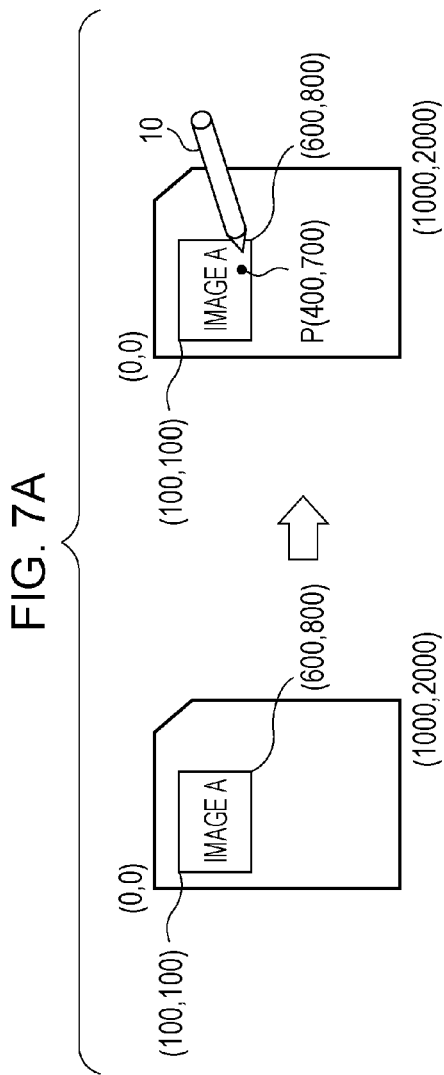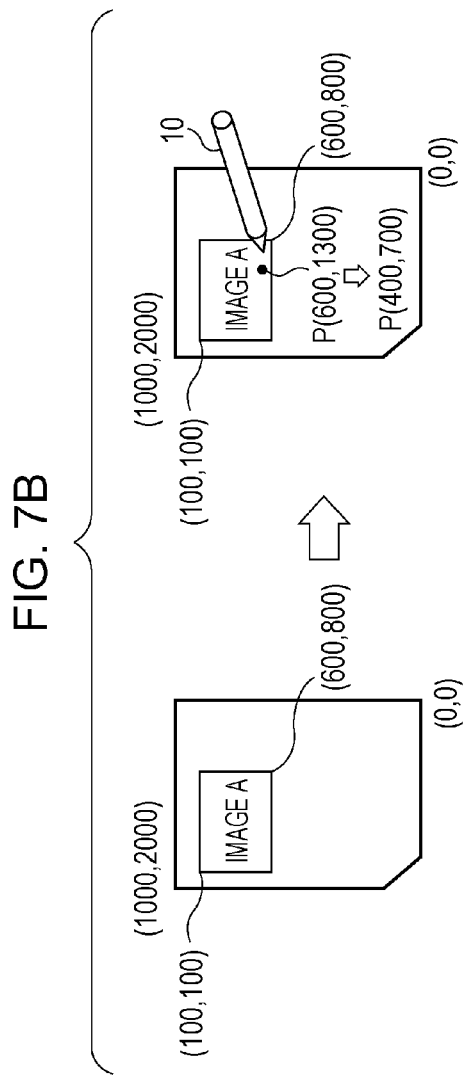

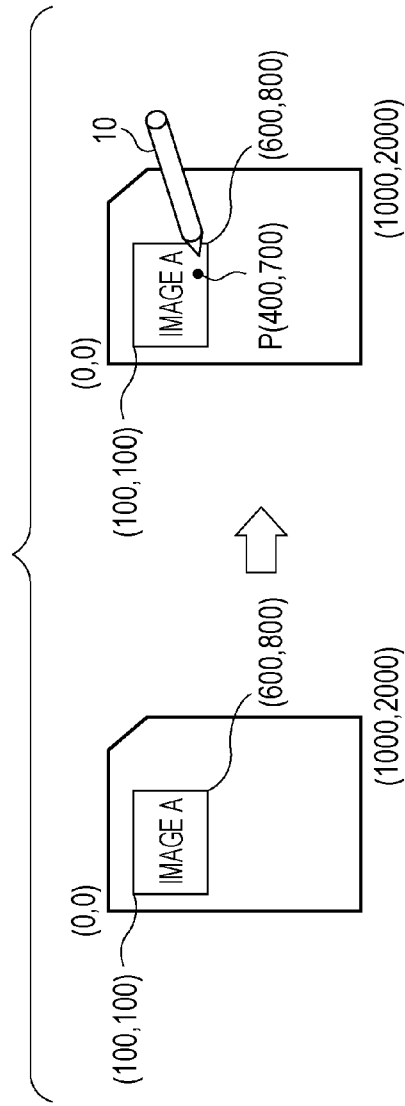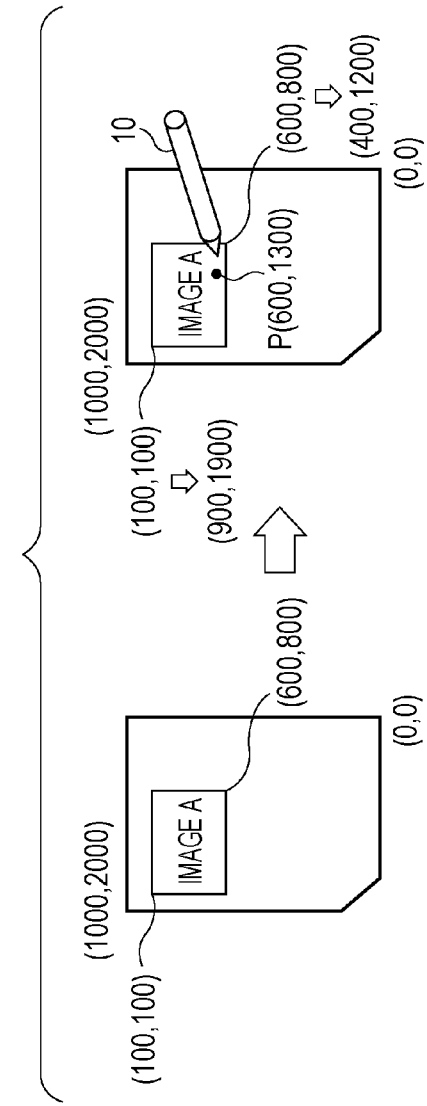

INFORMATION PROCESSING APPARATUS, INFORMATION PROCESSING METHOD, AND COMPUTER READABLE MEDIUM STORING PROGRAM FOR PROCESSING INFORMATION

CROSS-REFERENCE TO RELATED APPLICATIONS

This application is based on and claims priority under 35 USC 119 from Japanese Patent Application No. 2011-065724 filed Mar. 24, 2011.

BACKGROUND (i) Technical Field

The present invention relates to an information processing apparatus, an information processing method, and a computer readable medium storing a program for processing information.

(ii) Related Art

In a variety of available techniques, encoded information such as a barcode is attached to a medium such as printing paper or a ticket body and information related to the medium or an image printed on the medium is acquired by reading the encoded information.

SUMMARY

According to an aspect of the invention, there is provided an information processing apparatus. The information processing apparatus includes an acquisition unit that acquires encoded information at a position specified on a medium, the medium having the encoded information and an image printed thereon, the encoded information including identification information of the medium, first coordinate information identifying in a first coordinate system a position where the encoded information is printed, the first coordinate system defining the printing position of the encoded information, and alignment determination information determining an alignment of the encoded information, and the image, printed on the medium, at a position predetermined by second coordinate information in a second coordinate system, the second coordinate system defining the printing position of the image, an identifying unit that identifies the image corresponding to the encoded information by checking the first coordinate information included in the encoded information acquired by the acquisition unit against the second coordinate information of the images printed on the medium, and a determining unit that, in accordance with the alignment determination information included in the encoded information printed on the medium that the acquisition unit has acquired the encoded information from, determines whether the first coordinate system matches the second coordinate system in alignment. If the encoded information is acquired from the medium that the determining unit has determined as being off alignment between the first coordinate system and the second coordinate system, the identifying unit causes the first coordinate system to match the second coordinate system in alignment before identifying the image.

BRIEF DESCRIPTION OF THE DRAWINGS

Exemplary embodiments of the present invention will be described in detail based on the following figures, wherein:

FIG. 6 is a flowchart illustrating a process of the image processing apparatus of the first exemplary embodiment;

FIG. 7A illustrates a positional relationship of the image and the encoded information on the paper according to the first exemplary embodiment;

FIG. 7B illustrates a positional relationship of the image and the encoded information on the paper according to the first exemplary embodiment after a coordinate conversion operation is performed;

FIG. 9A illustrates a positional relationship of the image and the encoded information on the paper according to the second exemplary embodiment; and FIG. 9B illustrates a positional relationship of the image and the encoded information on the paper according to the second exemplary embodiment after the coordinate conversion operation is performed.

DETAILED DESCRIPTION

The exemplary embodiments of the invention are described below with reference to the drawings.

First Exemplary Embodiment

Figure 1:
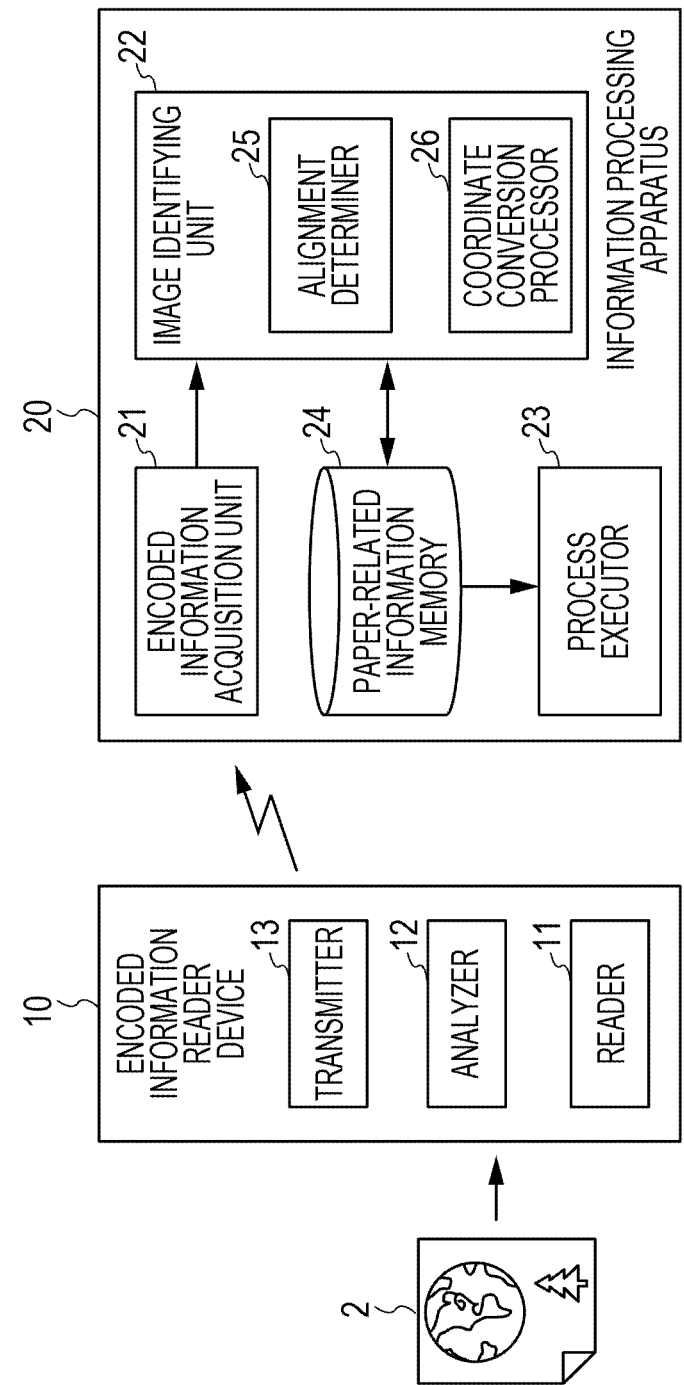
FIG. 1 is a block diagram of an information processing apparatus of an exemplary embodiment of the invention.
Figure 2:
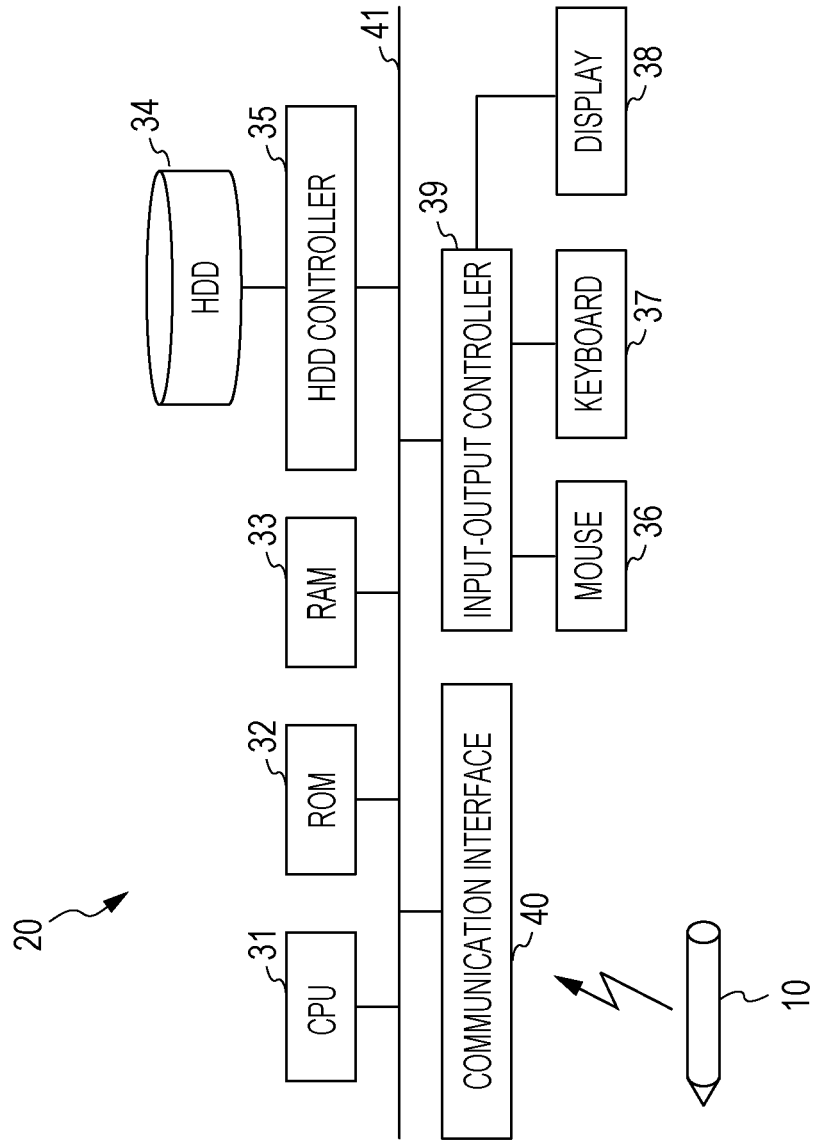
FIG. 2 illustrates a hardware configuration of a computer as an information processing apparatus of a first exemplary embodiment of the invention.

FIG. 1 is a block diagram of an information processing apparatus 20 of a first exemplary embodiment of the invention. FIG. 2 illustrates a hardware configuration of a computer serving as the information processing apparatus 20 of the first exemplary embodiment. FIG. 1 illustrates an encoded information reader device 10 in addition to the information processing apparatus 20. The encoded information reader device 10 is a pen-shaped reader device reading encoded information. The encoded information reader device 10 includes at the pen tip thereof a camera for photographing. The encoded information reader device 10 includes reader 11, analyzer 12, and transmitter 13. The reader 11 reads one piece of the encoded information printed on paper 2 by capturing the encoded information through the camera. The analyzer 12 analyzes the read encoded information, and acquires a paper ID, coordinate information, and alignment determination information of the paper 2. The transmitter 13 transmits the acquired information to the information processing apparatus 20. The analyzer 12 and the transmitter 13 may be constructed of hardware or a combination of hardware and software. In the discussion that follows, the encoded information reader device 10 is also referred to as a "pen 10."

The computer serving as the information processing apparatus 20 of the first exemplary embodiment may be constructed of a general-purpose hardware structure of related art. Specifically, as illustrated in FIG. 2, the computer includes central processing unit (CPU) 31, read-only memory (ROM) 32, random-access memory (RAM) 33, hard-disk drive (HDD) controller 35 connected to HDD 34, input-output controller 39 connected to mouse 36 and keyboard 37 arranged as input units, and display 38 as a display device, communication interface 40 arranged as a communication unit for communications between the encoded information reader device 10 and the information processing apparatus 20, and internal bus 41 interconnecting these elements.

Figure 3:
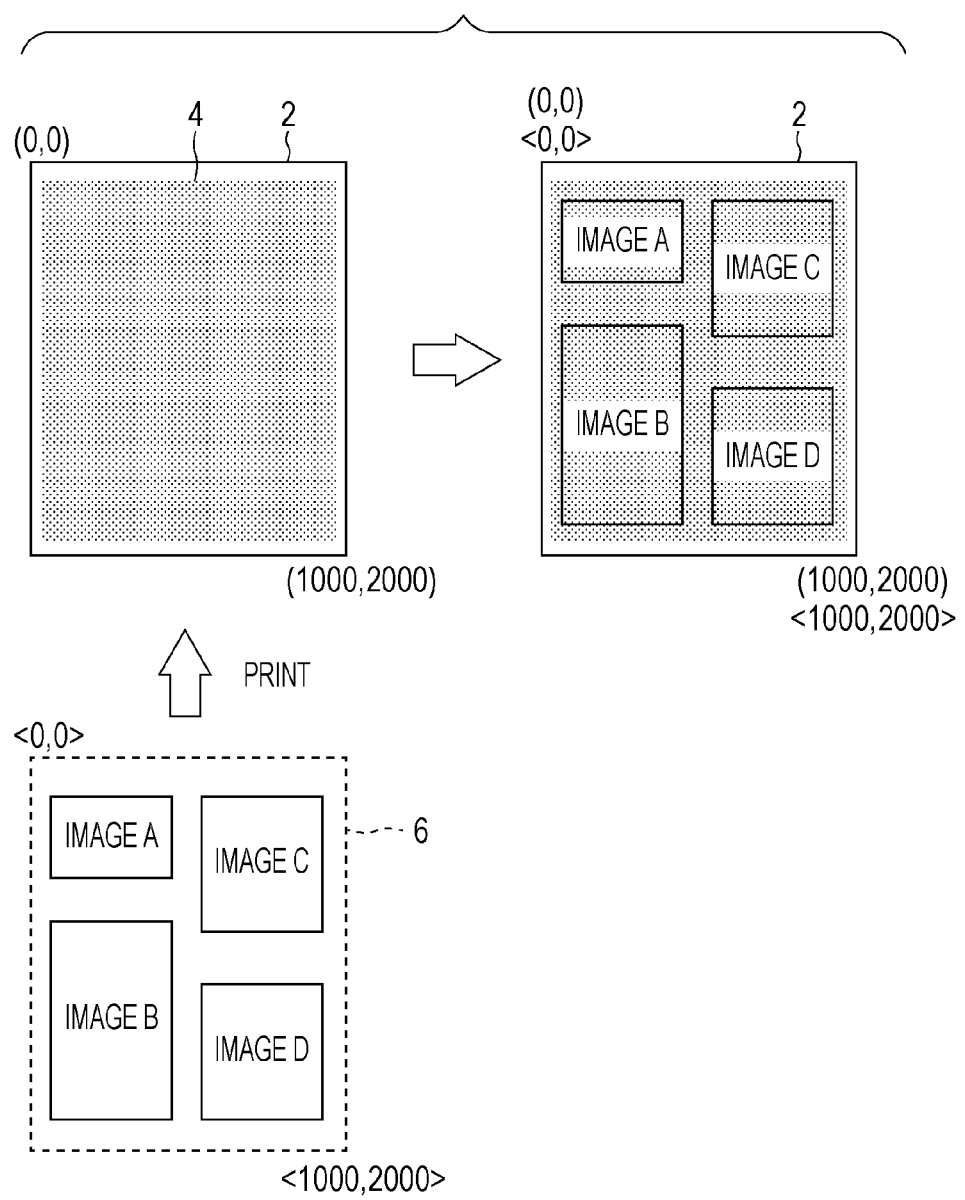
FIG. 3 illustrates an alignment relationship of paper, encoded information, and images according to the first exemplary embodiment.

Referring to FIG. 3, the paper 2 used in the first exemplary embodiment is described below. Encoded information 4 is generally printed on the whole printing area of the paper 2. For convenience of explanation, the encoded information 4 is illustrated in the form of visibly recognizable dots in FIG. 3. The encoded information 4 is data code constructed of a set of small points not clearly visible to human eyes and is printed on the surface of the paper 2. One piece of encoded information is recognized in accordance with a predetermined rule related to the arrangement of points, and is discriminated from another piece of encoded information. Each piece of encoded information includes identification information of the paper 2 carrying the encoded information (hereinafter also referred to as "paper identification (ID)"), coordinate information identifying a printing position of the encoded information in a coordinate system defining the printing position of the encoded information, and alignment determination information determining an alignment of the encoded information. According to the first exemplary embodiment, multiple points are arranged in accordance with a predetermined arrangement rule, and the points are used as information to determine the alignment of the encoded information. If the alignment of the encoded information is determined, the paper ID and the coordinate information, embedded in a predetermined position of the encoded information, may be read.

The coordinate information of the exemplary embodiment is represented by coordinate data in a two-dimensional system. First coordinate information included in the encoded information is coordinate data identifying the printing position of the encoded information on the paper 2 in a first coordinate system. The first coordinate system defines the printing position of the encoded information. The encoded information and the coordinate system of the paper 2 are determined by printing the encoded information on the paper 2. As illustrated in FIG. 3, the top left corner of the paper 2 is the origin (0, 0), and the whole size of the paper 2 is represented by (1000, 2000). Each piece of encoded information printed on the paper 2 includes the paper ID and the alignment determination information of the paper 2, identical in value to all the pieces of encoded information of the paper 2. The encoded information further includes the coordinate information of coordinates that change from piece to piece.

Print image data 6 is printed on the paper 2 having the encoded information 4 printed thereon. Alternatively, the print image data 6 may be printed first, followed by the printing of the encoded information 4. The encoded information 4 includes the coordinate information identifying the printing position on the paper 2. The encoded information 4 is thus printed at a position on the paper 2 identified by the coordinate information. The first coordinate system (hereinafter also referred to as an "information coordinate system") defining the printing position of the encoded information 4 is arranged on the paper 2. The paper 2 thus has the alignment thereof.

Image elements A to D included in the print image data 6 are printed at positions specified on the paper 2. To this end, a second coordinate system defining a printing position of an image is arranged in the print image data 6. Second coordinate information, i.e., coordinate data is set such that the image elements A to D are printed at the positions specified in the second coordinate system. The second coordinate system (hereinafter also referred to as an "image coordinate system") defining the printing position of the image has the origin (0, 0) at the top left corner of the print image data 6 and the whole size of the print image data 6 has the same size (1000, 2000) as that of the paper 2.

As illustrated in FIG. 3, coordinates in the information coordinate system and coordinates in the image coordinate system are discriminated using different types of parenthesizing. For example, the coordinates in the image coordinate system may be enclosed in angle brackets as "<0, 0>". A user may recognize the alignment of the paper 2 with the print image data 6 printed on the paper 2. When the paper 2 is used, the user may hold the paper 2 or put the paper 2 on a desk with the top side of each of the image elements A to D on top.

Referring back to FIG. 1, the configuration of the information processing apparatus 20 is described below. The information processing apparatus 20 includes encoded information acquisition unit 21, image identifying unit 22, process executor 23, and paper-related information memory 24. The encoded information acquisition unit 21 acquires the encoded information transmitted from the encoded information reader device 10. The image identifying unit 22 checks the coordinate information included in the encoded information acquired by the encoded information acquisition unit 21 against the coordinate information of each image printed on the paper 2, and thus identifies the image corresponding to the encoded information. The image identifying unit 22 includes alignment determiner 25 and coordinate conversion processor 26. The alignment determiner 25 references the alignment determination information included in the encoded information printed on the paper 2 and acquired by the encoded information acquisition unit 21 for the first time and determines whether the information coordinate system and the image coordinate system match in alignment. If the encoded information is acquired from the paper 2 that the alignment determiner 25 has determined as being off alignment between the information coordinate system and the image coordinate system, the coordinate conversion processor 26 performs a coordinate conversion operation to cause the information coordinate system to match the image coordinate system in alignment. The process executor 23 references the paper-related information memory 24 and executes a process in accordance with execution information corresponding to an image identified by the image identifying unit 22.

Figure 4:
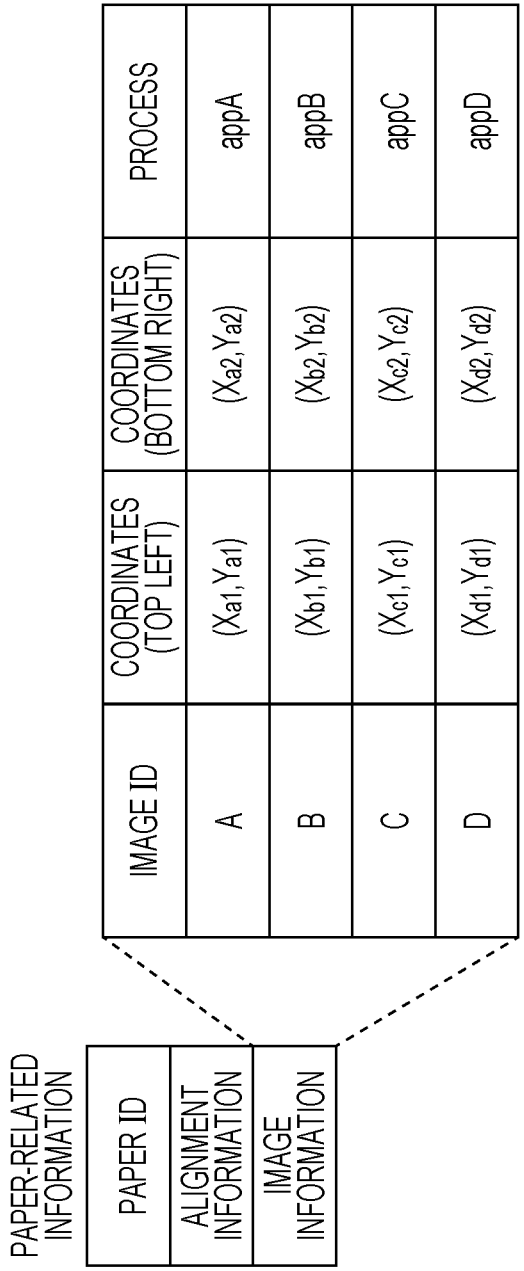
FIG. 4 illustrates an example of a data structure of paper-related information stored on a paper-related information memory according to the first exemplary embodiment.

FIG. 4 illustrates an example of the data structure of paper-related information stored on the paper-related information memory 24 of the exemplary embodiment. The paper-related information is produced in map with each paper 2, and includes an paper ID, alignment information, and image information. The paper ID is assigned to each paper 2 when the paper 2 has undergone printing, and identifies each paper 2. According the exemplary embodiment, the alignment information indicates whether the encoded information and the image, printed on the paper 2, match or are reversed to each other in alignment. Determination result of the alignment determiner 25 is set in the alignment information. An initial value indicating a default state remains set in the alignment information until any value is set. The image information includes information related to each image element included in the print image data 6 printed on the paper 2. In the discussion of the exemplary embodiment, the image element may also be simply referred to as an "image." The image information includes the image ID, the coordinate information, and process, each preset on a per image basis. The image ID is identification information identifying the image. According to the exemplary embodiment, an area of an image to be printed on the paper 2 is represented by a rectangular shape. Coordinates at the top left corner and at the bottom right corner of the rectangular shape are used as the coordinate information identifying a printing position of the image on the paper 2. If the image printed on the paper 2 is pointed to by the pen 10 for selection, execution information of a process to be performed in response is set when the process is performed. According to the exemplary embodiment, a storage location and a name of an application are set so that the application is executed if the image is selected. The invention is not limited to this arrangement. FIG. 4 illustrates the image information including information related to the image elements A to D illustrated in FIG. 3.

Elements 21 to 23 of the information processing apparatus 20 may be implemented when the computer as the information processing apparatus 20 and a program running on the CPU 31 in the computer work in concert with each other. The paper-related information memory 24 may be the HDD 34 in the information processing apparatus 20. The paper-related information memory 24 may be another memory on another apparatus accessible via a network.

The program used in the exemplary embodiment may be provided via a communication unit. The program may also be provided in a state stored on a computer readable recording medium such as a compact disk read-only memory (CD-ROM), or digital versatile disk ROM (DVD-ROM). The program provided via the communication unit or the computer readable recording medium is installed on the computer. The CPU of the computer executes the installed program, thereby performing a variety of processes.

The print image data 6 may be printed on the paper 2 that has the encoded information 4 printed thereon. In such a case, the paper 2 may be set in a tray of a printer or the like. The alignment of the encoded information 4 printed on the paper 2 set in the tray is difficult to visibly recognize. If the alignment of the encoded information 4 matches a vertical alignment of the image, the information coordinate system and the image coordinate system match in alignment as illustrated in FIG. 3. The coordinates included in the encoded information 4 defined by the information coordinate system match the coordinates included in the print image data 6 defined by the image coordinate system. More specifically, if a given point in the image printed on the paper 2 is pointed to by the pen 10, for example, if (100, 120) on the image in the image coordinate system is pointed to, the coordinate information included in the encoded information 4 at the pointed position is (100, 120).

Figure 5:
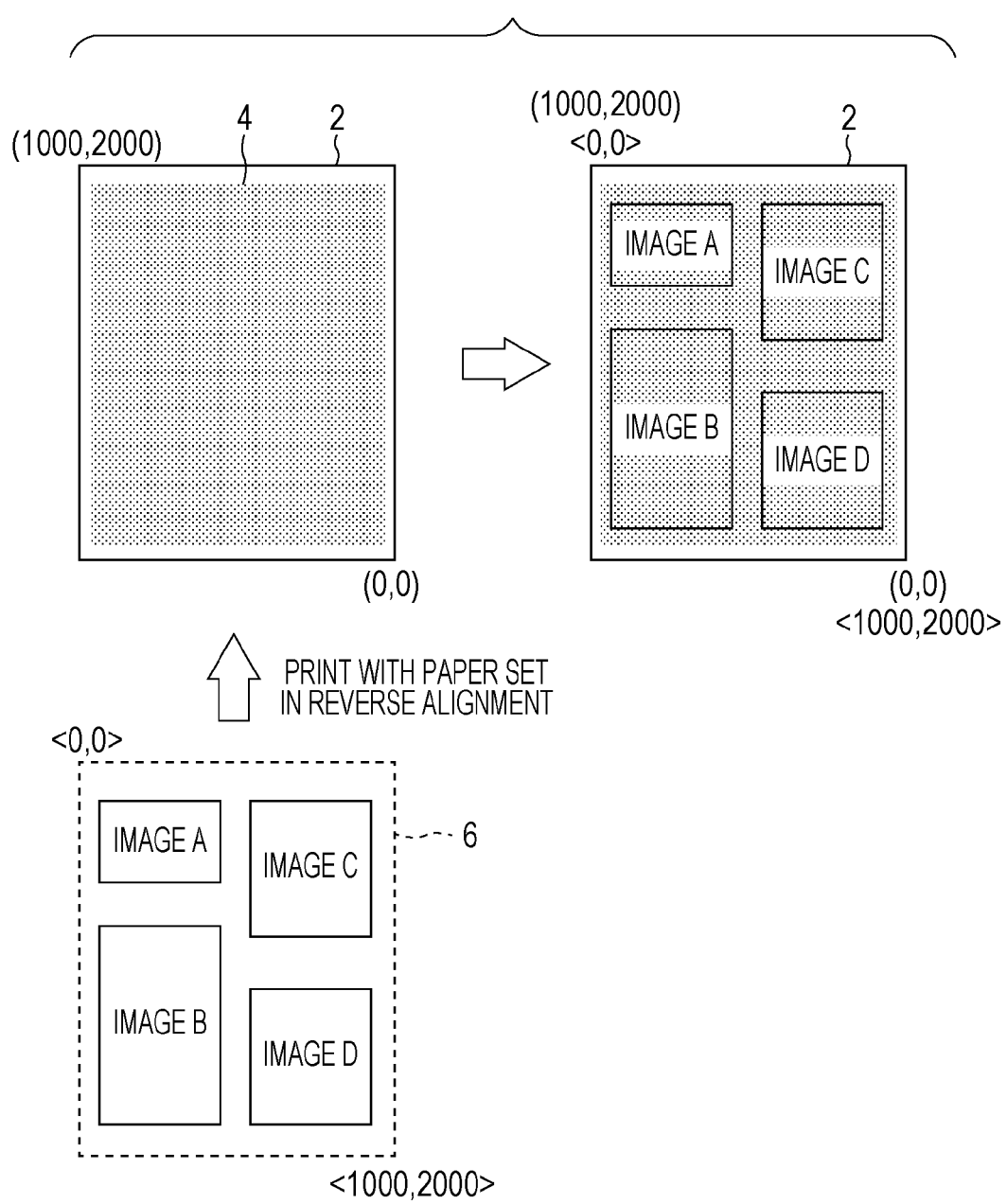
FIG. 5 illustrates another alignment relationship of the paper, the encoded information, and the images according to the first exemplary embodiment.

If the paper 2 (the encoded information 4) is set in a reverse alignment in the tray, the information coordinate system and the image coordinate system do no match in alignment as illustrated in FIG. 5. If (100, 120) on the image in the image coordinate system is pointed to by the pen 10, the coordinate information included in the encoded information 4 at the pointed position is not (100, 120). More specifically, even if the user intends to point to the image A, the image identifying unit 22 fails to correctly recognize that the image A is pointed to.

According to the exemplary embodiment, the selection of the image A is correctly recognized even if the printing is performed as illustrated in FIG. 5. A process of the exemplary embodiment to correctly recognize the image element selected by the pen 10 is described below.

It is assumed that the encoded information 4 and the print image data 6 have been printed on the paper 2. Whether the coordinate systems match each other in alignment as illustrated in FIG. 3 or do no match each other in alignment as illustrated in FIG. 5 is not known about the paper 2.

The user holds the paper 2 or puts the paper 2 on a desk in a correct vertical alignment. The correct vertical alignment refers to the position at which the image is aligned correctly (with the top side thereof on top). The user operates the pen 10 to point to the position where a desired image is printed on the paper 2, and selects the image through a predetermined operation. The predetermined operation refers to an operation of the user that captures the encoded information 4 with the camera at the tip of the pen 10. The reader 11 of the pen 10 reads one piece of the encoded information 4 through the predetermined operation. If the encoded information 4 is captured with the pen 10 in a position turned around off a correct gripping position, a read image also may appear upside down. The user photographs the encoded information 4 with the pen 10 in the correct gripping position. For example, the pen 10 may be designed to be shaped to indicate a correct gripping position, or designed to be labeled with marking indicating a correct gripping position. In an exemplary embodiment, the pen 10 may be provided with a preventive unit that prevents the pen 10 in an incorrect gripping position from capturing the encoded information 4. In another exemplary embodiment, the pen 10 may be provided with a warning unit that emits a warning if the user attempts to use the pen 10 in an incorrect gripping position.

If the encoded information 4 is captured, the analyzer 12 analyzes the read image and identifies the alignment of the encoded information 4. More specifically, the analyzer 12 identifies the alignment of the encoded information 4 by referencing the arrangement of points forming the alignment determination information of the encoded information 4. The paper 2 is correctly aligned if the image thereof is aligned with the top side on top. The alignment of the encoded information 4 is determined as being correct if the read encoded information 4 is in a correct alignment, i.e., the read encoded information 4 is correctly aligned with the top side thereof on top as with the image. The alignment of the encoded information 4 is determined as being reversed or opposite if the read encoded information 4 reversely aligned. Upon identifying the alignment of the encoded information 4, the analyzer 12 decodes code data included in the encoded information 4, and extracts the paper ID and the coordinates. The transmitter 13 transmits to the information processing apparatus 20 the extracted paper ID and coordinates, and the alignment determination information indicating the identified alignment of the encoded information 4.

A process of the information processing apparatus 20 having received the transmitted information is described with reference to a flowchart of FIG. 6.

The encoded information acquisition unit 21 acquires the encoded information by receiving the encoded information wirelessly transmitted from the pen 10 (step S101). The encoded information acquisition unit 21 extracts from the acquired information the paper ID, the coordinates, and the alignment determination information (step S102). According to the exemplary embodiment, the pen 10 analyzes captured data, decodes the encoded information 4, and acquires encoded information including data of the paper ID, the coordinates, and the alignment determination information. Alternatively, the captured data may be transmitted to the information processing apparatus 20 and the information processing apparatus 20 may analyze the captured data.

Upon receiving the encoded information 4 acquired by the encoded information acquisition unit 21, the image identifying unit 22 searches for the paper-related information according to the paper ID and determines whether the alignment information of the paper 2 is set. As clear from the process content to be described below, it is determined that the encoded information 4 is read from the paper 2 for the first time if the encoded information 4 includes the initial value set as the alignment information corresponding to the read paper 2. If the initial value remains set as the alignment information, the image identifying unit 22 determines that the alignment information is still unset (no branch from step S103). The alignment determiner 25 references the alignment determination information and determines whether the image coordinate system of the image printed at the position that the user of the paper 2 specifies using the pen 10 matches the information coordinate system of the read encoded information 4 (step S104).

If information indicating the correct alignment is set in the alignment determination information (no branch from step S105), the alignment determiner 25 determines that the print image data 6 matches the encoded information 4 in alignment. The alignment determiner 25 then sets, in the alignment information of the paper-related information of the paper 2, information representing data meaning match, such as the word "match" (step S107). If information indicating a reverse alignment is set for the alignment information (yes branch from step S105), the alignment determiner 25 determines that the print image data 6 and the encoded information 4 are reversed to each other in alignment. The alignment determiner 25 then sets, in the alignment information of the paper-related information of the paper 2, information representing data meaning reversed, such as the word "reversed" (step S106). The initial value set in the alignment information is updated through this process. If the encoded information 4 is read from the same paper 2 hereinafter, the image identifying unit 22 determines in step S103 that the encoded information 4 is read not for the first time.

If the image identifying unit 22 determines in step S103 that the alignment information has been set (no branch from step S103), the alignment determiner 25 references the alignment information included in the paper-related information of the paper 2 to determine whether the print image data 6 and the encoded information 4 match each other in alignment. If the encoded information 4 is read for the first time (yes branch from step S103), the alignment determiner 25 sets the alignment information. The alignment determiner 25 then references the alignment information included in the paper-related information of the paper 2 to determine whether the print image data 6 and the encoded information 4 match each other in alignment. If the print image data 6 and the encoded information 4 match each other in alignment (no branch from step S108), a coordinate conversion operation to be discussed below is not performed. If the print image data 6 and the encoded information 4 do not match each other in alignment (yes branch from step S108), the coordinates of the encoded information 4 are converted to match the image coordinate system in the exemplary embodiment (step S109). The coordinate conversion operation is described below with reference to FIGS. 7A and 7B.

As illustrated in FIGS. 7A and 7B, a rectangular image A is printed. The printed image A has coordinates (100, 100) at the top left corner thereof and coordinates (600, 800) at the bottom right corner thereof in the image coordinate system. The user may point to any position within the area of the image A using the pen 10. For example, the encoded information 4 at a point P having coordinates (400, 700) in the image coordinate system may be read.

As illustrated in FIG. 7A, the print image data 6 and the encoded information 4 match each other in alignment. In this example, coordinates of the point P are (400, 700) in the image coordinate system, and are also (400, 700) in the information coordinate system. Since the coordinates of the point P in the two systems match, the coordinate conversion operation in step S109 is not performed. The coordinates in the information coordinate system are used directly as the coordinates in the image coordinate system. More specifically, the image identifying unit 22 checks the coordinates (400, 700) of the point P included in the encoded information 4 against coordinates (coordinates at the top left corner and the bottom right corner) of each image set in the image information of the paper-related information. The image identifying unit 22 thus identifies the image that the user has selected using the pen 10 as the image A having the coordinates (100, 100) at the top left corner thereof and the coordinates (600, 800) at the bottom right corner thereof (step S110).

As illustrated in FIG. 7B, the print image data 6 and the encoded information 4 do not match each other in alignment. The coordinates of the point P are (400, 700) in the image coordinate system, and are (600, 1300) in the information coordinate system as illustrated in FIG. 7B. More specifically, the coordinates of the point P included in the encoded information 4 are (600, 1300).

The coordinate conversion processor 26 converts the point P in the read encoded information 4 into a position point-symmetrical with respect to the center of the paper 2. More specifically, the coordinates of a point serving as a reference of point-symmetry are doubled, and then the coordinates (600, 1300) of the read point P are subtracted from the doubled coordinates of the reference point. The size of the paper 2 is (0, 0)-(1000, 200), and the center of the paper 2 is (500, 1000). The X coordinate is calculated as 500×2-600=400, and the Y coordinate is calculated as 1000×2-1300=700. In the way, the coordinates (600, 1300) of the point P in the information coordinate system are converted to the coordinates (400, 700) such that the coordinates of the point P in the information coordinate system match the image coordinate system. The image identifying unit 22 checks the coordinate-converted coordinates (400, 700) against the coordinates of each image element (coordinates at the top left corner and the bottom right corner) set in the image information of the paper-related information. The image identifying unit 22 thus identifies the image selected by the user with the pen 10 as the image A having the coordinates (100, 100) at the top left corner thereof and the coordinates (600, 800) at the bottom right corner thereof (step S110).

The image selected by the user is identified as the image A even if the image coordinate system and the information coordinate system do not match each other in alignment. The process executor 23 references the paper-related information and executes a process specified by the execution information "appA" set for the image A (step S111).

The paper 2 may be a menu of a restaurant with an image of food and drinks printed thereon, and the user may select an item from the image (menu) using the pen 10. Encoded information corresponding to the image is then sent to the information processing apparatus 20 at a kitchen of the restaurant. The information processing apparatus 20 identifies the image selected by the user, and performs a process responsive to the image. The process may include receiving the order for the item in the menu illustrated in the image, and instructing a cook in charge to cook the item. In this way, the order for the item in the menu may be automatically received by selecting the image. If the paper 2 is a product catalogue, a product on the catalogue may be purchased by selecting the image of the product in the same manner as described above.

Second Exemplary Embodiment

If the image coordinate system and the information coordinate system do not match each other in alignment in the first exemplary embodiment, the read encoded information 4 is coordinate-converted each time (step S109 of FIG. 6) so that the coordinates of the encoded information 4 match the image coordinate system. According to a second exemplary embodiment, the coordinates of the image are converted such that the coordinates of the image match the coordinates in the encoded information.

Figure 8:
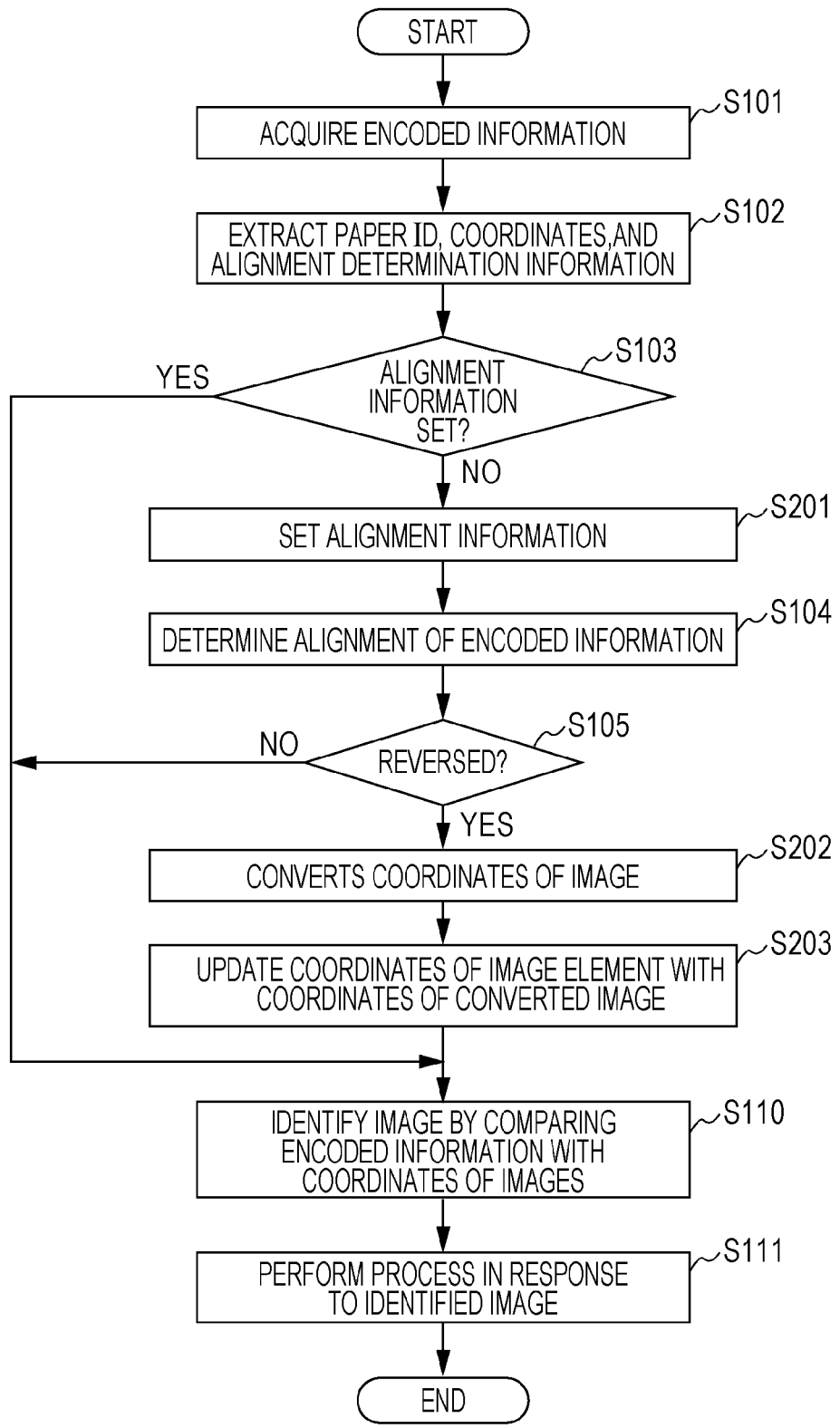
FIG. 8 is a flowchart illustrating a process of an information processing apparatus of a second exemplary embodiment.

The second exemplary embodiment is identical in configuration to the first exemplary embodiment. The second exemplary embodiment is different from the first exemplary embodiment in terms of the process of the image identifying unit 22 of FIG. 1. A process of the second exemplary embodiment is described below with reference to a flowchart of FIG. 8. As illustrated in FIG. 8, steps identical to those in the process of FIG. 6 are designated with the same step numbers and the discussion thereof is omitted as appropriate.

Upon acquiring the encoded information read by the pen 10, the image identifying unit 22 determines in accordance with the paper ID whether the alignment information of the paper 2 is set in the paper-related information of the paper 2. If the image identifying unit 22 determines, from the fact that the initial value is still set, that the alignment information is not set (no branch from step S103), the alignment determiner 25 sets, in the initial value in the alignment information of the paper-related information, information representing that the alignment has been determined (step S201). According to the exemplary embodiment, the initial value in the alignment information may be simply updated. It is sufficient if the encoded information 4 hereafter is determined as no longer being the encoded information 4 read from the paper 2 for the first time. Any value other than the initial value is acceptable as a value to be set in the alignment information.

The alignment determiner 25 references the alignment determination information to determine whether the image coordinate system and the information coordinate system match each other in alignment (step S104). If information indicating a correct alignment is set in the alignment determination information (no branch from step S105), a coordinate conversion operation to be discussed later is not performed. If information indicating a reversed alignment is set in the alignment determination information (yes branch from step S105), the coordinates of the image are converted to match the image coordinate system (step S202). The coordinate conversion operation is described with reference to FIGS. 9A and 9B.

As illustrated in FIGS. 9A and 9B, a rectangular image A is printed as previously discussed with reference to FIGS. 7A and 7B. The printed image A has coordinates (100, 100) at the top left corner thereof and coordinates (600, 800) at the bottom right corner thereof in the image coordinate system. The user may point to any position within the area of the image A using the pen 10. For example, the encoded information 4 at a point P having coordinates (400, 700) in the image coordinate system may be read.

As illustrated in FIG. 9A, the print image data 6 and the encoded information 4 match each other in alignment as previously discussed with reference to FIG. 7A. In this example, coordinates of the point P are (400, 700) in the image coordinate system, and are (400, 700) in the information coordinate system. Since the coordinates of the point P in the two systems match, the coordinate conversion operation in step S109 is not performed. The coordinates in the information coordinate system are used directly as the coordinates in the image coordinate system. More specifically, the image identifying unit 22 checks the coordinates (400, 700) of the point P included in the encoded information 4 against coordinates (coordinates at the top left corner and the bottom right corner) of each image set in the image information of the paper-related information. The image identifying unit 22 thus identifies the image that the user has selected using the pen 10 as the image A having the coordinates (100, 100) at the top left corner thereof and the coordinates (600, 800) at the bottom right corner thereof (step S110).

As illustrated in FIG. 9B, the print image data 6 and the encoded information 4 do not match each other in alignment as previously discussed in FIG. 7B. The coordinates of the point P are (400, 700) in the image coordinate system, and are (600, 1300) in the information coordinate system as illustrated in FIG. 9B. More specifically, the coordinates of the point P included in the encoded information 4 are (600, 1300).

The coordinate conversion processor 26 of the second exemplary embodiment converts the coordinates of the image in the image coordinate system to coordinates matching the information coordinate system. According to the exemplary embodiment, the image is shifted to a position point-symmetrical with respect to the center of the paper 2. More specifically, the coordinates of a point serving as a reference of point-symmetry are doubled, and then the coordinates (600, 1300) of the read point P are subtracted from the doubled coordinates of the reference point. Since the size of the paper 2 is (0, 0)-(1000, 2000), the coordinates of the center of the paper 2 are (500, 1000). The coordinates identifying the area of the image A are (100, 100), and (600, 800). At the top left coordinates (100, 100), the X coordinate is calculated as 500×2−100=900, and the Y coordinate is calculated as 1000×2−100=1900. In the way, the coordinates (100, 100) in the image coordinate system are converted into (900, 1900) in the information coordinate system. Similarly, at the bottom right coordinates (600, 800), the X coordinate is calculated as 500×2−600=400, and the Y coordinate is calculated as 1000×2−800=1200. In the way, the coordinates (600, 800) in the image coordinate system are converted into (400, 1200) in the information coordinate system.

The image A has been discussed with reference to FIG. 9A. The coordinate conversion operation is performed on all image elements included in the printed image, for example, image elements A to D in FIG. 5. The coordinate conversion processor 26 then updates the coordinates of the image element included in the image information stored on the paper-related information memory 24 with the converted coordinates (step S203).

The image identifying unit 22 checks the coordinates (600, 1300) included in the encoded information 4 against the converted coordinates of each image element (at the top left and the bottom right corners) registered in the image information of the paper-related information. The image identifying unit 22 identifies the image selected by the user with the pen 10 to be the image A having the coordinates (900, 1900) at the top left corner thereof and the coordinates (400, 1200) at the bottom right corner thereof (step S110). The process executor 23 references the paper-related information and then executes the process specified by the execution information set for the image A (step S111).

The image coordinate system may not match the information coordinate system in the exemplary embodiment when the image corresponding to the encoded information 4 is identified in step S110. Even in this case, the information processing apparatus 20 is free from repeating the coordinate conversion operation once the encoded information 4 has been read. More specifically, the coordinate conversion operation in step S202 is performed on all the image elements only when the encoded information 4 is read from the paper 2 for the first time.

In each of the exemplary embodiments, the image happens to be upside down, in other words, the image coordinate system is 180 degrees off alignment with the information coordinate system. The exemplary embodiments are applicable if the coordinate systems are off alignment at any other angle than 180 degrees. For example, an off alignment angle may be 90 degrees.

In the above discussion, the medium on which the image or the like is printed is paper. The medium is not limited to paper. Any medium is acceptable as long as medium permits image or the like to be printed thereon.

In the paper-related information, the execution information causing the process to be executed is mapped to each image element. Alternatively, mere data may be mapped to each image element.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
    an acquisition unit that acquires encoded information at a position specified on a medium, the medium having the encoded information and an image printed thereon, the encoded information including identification information of the medium, first coordinate information identifying in a first coordinate system a position where the encoded information is printed, the first coordinate system defining the printing position of the encoded information, and alignment determination information determining an alignment of the encoded information, and the image, printed on the medium, at a position predetermined by second coordinate information in a second coordinate system, the second coordinate system defining the printing position of the image;
    an identifying unit that identifies the image corresponding to the encoded information by checking the first coordinate information included in the encoded information acquired by the acquisition unit against the second coordinate information of the images printed on the medium; and
    a determining unit that, in accordance with the alignment determination information included in the encoded information printed on the medium that the acquisition unit has acquired the encoded information from, determines whether the first coordinate system matches the second coordinate system in alignment,
    wherein if the encoded information is acquired from the medium that the determining unit has determined as being off alignment between the first coordinate system and the second coordinate system, the identifying unit causes the first coordinate system to match the second coordinate system in alignment before identifying the image.

2. The information processing apparatus according to claim 1, wherein if the encoded information is acquired from the medium that the determining unit has determined as being off alignment between the first coordinate system and the second coordinate system, the identifying unit performs a coordinate conversion operation to cause the first coordinate information included in the encoded information to match the second coordinate system.

3. The information processing apparatus according to claim 1, wherein if the encoded information is acquired from the medium that the determining unit has determined as being off alignment between the first coordinate system and the second coordinate system, the identifying unit performs a coordinate conversion operation to cause the second coordinate information of the image printed on the medium to match the first coordinate system.

4. The information processing apparatus according to claim 1, further comprising a memory that stores the identification information of the medium and a determination result of the determining unit with the identification information mapped to the determination result,
    wherein the determining unit registers on the memory the determination result and the identification information of the medium included in the encoded information with the determination result mapped to the identification information; and
    wherein the identifying unit refers to the memory for the determination result corresponding to the identification information of the medium included in the encoded information acquired by the acquisition unit, and determines in accordance with the determination result whether the first coordinate system matches the second coordinate system in alignment.

5. The information processing apparatus according to claim 1, further comprising a memory that stores the identification information of the medium, identification information of the image printed on the medium, and execution information identifying an operation to be performed if the image is specified; and
    an executor unit that refers to the memory for the execution information corresponding to the image identified by the identifying unit, and executes an operation in accordance with the execution information.

6. An information processing method, comprising:
    acquiring encoded information at a position specified on a medium, the medium having the encoded information and an image printed thereon, the encoded information including identification information of the medium, first coordinate information identifying in a first coordinate system a position where the encoded information is printed, the first coordinate system defining the printing position of the encoded information, and alignment determination information determining an alignment of the encoded information, and the image, printed on the medium, at a position predetermined by second coordinate information in a second coordinate system, the second coordinate system defining the printing position of the image;
    identifying the image corresponding to the encoded information by checking the first coordinate information included in the acquired encoded information against the second coordinate information of the images printed on the medium; and
    determining, in accordance with the alignment determination information included in the encoded information printed on the medium that the encoded information has been acquired from, whether the first coordinate system matches the second coordinate system in alignment,
    wherein if the encoded information is acquired from the medium that has been determined as being off alignment between the first coordinate system and the second coordinate system, the first coordinate system is caused to match the second coordinate system in alignment before the image is identified.

7. A non-transitory computer readable medium storing a program causing a computer to execute a process for processing information, the process comprising:

acquiring encoded information at a position specified on a medium, the medium having the encoded information and an image printed thereon, the encoded information including identification information of the medium, first coordinate information identifying in a first coordinate system a position where the encoded information is printed, the first coordinate system defining the printing position of the encoded information, and alignment determination information determining an alignment of the encoded information, and the image, printed on the medium, at a position predetermined by second coordinate information in a second coordinate system, the second coordinate system defining the printing position of the image;

identifying the image corresponding to the encoded information by checking the first coordinate information included in the acquired encoded information against the second coordinate information of the images printed on the medium; and determining, in accordance with the alignment determination information included in the encoded information printed on the medium that the encoded information has been acquired from, whether the first coordinate system matches the second coordinate system in alignment, wherein if the encoded information is acquired from the medium that has been determined as being off alignment between the first coordinate system and the second coordinate system, the first coordinate system is caused to match the second coordinate system in alignment before the image is identified.

* * * * *